United States Patent
Sun et al.

(10) Patent No.: US 12,047,133 B2
(45) Date of Patent: Jul. 23, 2024

(54) TRANSMIT PRECODING MATRIX DESIGN FOR 8 TX COHERENT PUSCH OPERATION

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Huaning Niu, San Jose, CA (US); Sigen Ye, San Diego, CA (US); Xiang Chen, Campbell, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/934,635

(22) Filed: Sep. 23, 2022

(65) Prior Publication Data

US 2024/0113751 A1      Apr. 4, 2024

(51) Int. Cl.
*H04L 1/02*     (2006.01)
*H04B 7/0456*   (2017.01)
*H04W 72/04*    (2023.01)

(52) U.S. Cl.
CPC ......... *H04B 7/0456* (2013.01); *H04W 72/04* (2013.01)

(58) Field of Classification Search
CPC ............................. H04B 7/0456; H04W 72/04
USPC ........................................................ 375/267
See application file for complete search history.

(56) References Cited

U.S. PATENT DOCUMENTS

| | | | |
|---|---|---|---|
| 2018/0183503 A1* | 6/2018 | Rahman | H04B 7/0486 |
| 2020/0287602 A1* | 9/2020 | Park | H04W 72/23 |
| 2020/0350963 A1* | 11/2020 | Su | H04B 7/063 |
| 2022/0279492 A1* | 9/2022 | Park | H04W 72/23 |
| 2023/0148388 A1* | 5/2023 | Rahman | H04B 7/0404 375/267 |

FOREIGN PATENT DOCUMENTS

KR     20190089845     *  7/2019

* cited by examiner

*Primary Examiner* — Helene E Tayong
(74) *Attorney, Agent, or Firm* — Fay Kaplun & Marcin, LLP

(57) ABSTRACT

A user equipment (UE) configured to receive a Physical Uplink Shared Channel (PUSCH) configuration from a network, wherein the PUSCH configuration includes a codebook based Transmit Precoding Matrix Indicator (TPMI) with an indication of a Transmit Precoding Matrix (TPM) for 8 antenna ports and transmit PUSCH according to the PUSCH configuration.

16 Claims, 6 Drawing Sheets

Antenna Architecture 410

Antenna Architecture 420

Antenna Architecture 430

Antenna Architecture 440

TRANSMIT PRECODING MATRIX DESIGN FOR 8 TX COHERENT PUSCH OPERATION

BACKGROUND

Currently, New Radio (NR) uplink (UL) supports two multiple input/multiple output (MIMO) operation modes (codebook and non-codebook) for a maximum of 4 Tx and a maximum of 4 layers in the Physical Uplink Shared Channel (PUSCH). In codebook based PUSCH operation, precoding and a number of layers is indicated by the "Precoding information and number of layers" field in the scheduling Downlink Control Information (DCI). The possible precoding, e.g., Transmit Precoding Matrix (TPM), is hardcoded in the 3GPP standards. The TPM is indicated by the network to the user equipment (UE) in a TPM Indicator (TPMI). In nonCodebook based PUSCH operation, the precoding and number of layers is indicated by the SRS resource indicator (SRI) field in the scheduling DCI.

In addition, for codebook UL MIMO operation, NR supports three different coherency modes: Non-coherent: codebookSubset="nonCoherent"; Partial-coherent: codebookSubset="partialAndNonCoherent"; and Full-coherent: codebookSubset="fullyAndPartialAndNonCoherent."

SUMMARY

Some exemplary embodiments are related to a processor of a user equipment (UE) configured to receive a Physical Uplink Shared Channel (PUSCH) configuration from a network, wherein the PUSCH configuration includes a codebook based Transmit Precoding Matrix Indicator (TPMI) comprising an indication of a Transmit Precoding Matrix (TPM) for 8 antenna ports and transmit PUSCH according to the PUSCH configuration.

Other exemplary embodiments are related to a user equipment (UE) having a transceiver configured to communicate with a network and a processor communicatively coupled to the transceiver and configured to receive a Physical Uplink Shared Channel (PUSCH) configuration from the network, wherein the PUSCH configuration includes a codebook based Transmit Precoding Matrix Indicator (TPMI) comprising an indication of a Transmit Precoding Matrix (TPM) for 8 antenna ports and transmit PUSCH according to the PUSCH configuration.

Still further exemplary embodiments are related to a processor of a base station configured to configure a Physical Uplink Shared Channel (PUSCH) configuration, wherein the PUSCH configuration includes a codebook based Transmit Precoding Matrix Indicator (TPMI) comprising an indication of a Transmit Precoding Matrix (TPM) for 8 antenna ports and transmit the PUSCH configuration to a user equipment (UE).

Additional exemplary embodiments are related to a base station having a transceiver configured to communicate with a user equipment (UE) and a processor communicatively coupled to the transceiver and configured to configure a Physical Uplink Shared Channel (PUSCH) configuration, wherein the PUSCH configuration includes a codebook based Transmit Precoding Matrix Indicator (TPMI) comprising an indication of a Transmit Precoding Matrix (TPM) for 8 antenna ports and transmit the PUSCH configuration to the UE.

DETAILED DESCRIPTION

Figure 1:
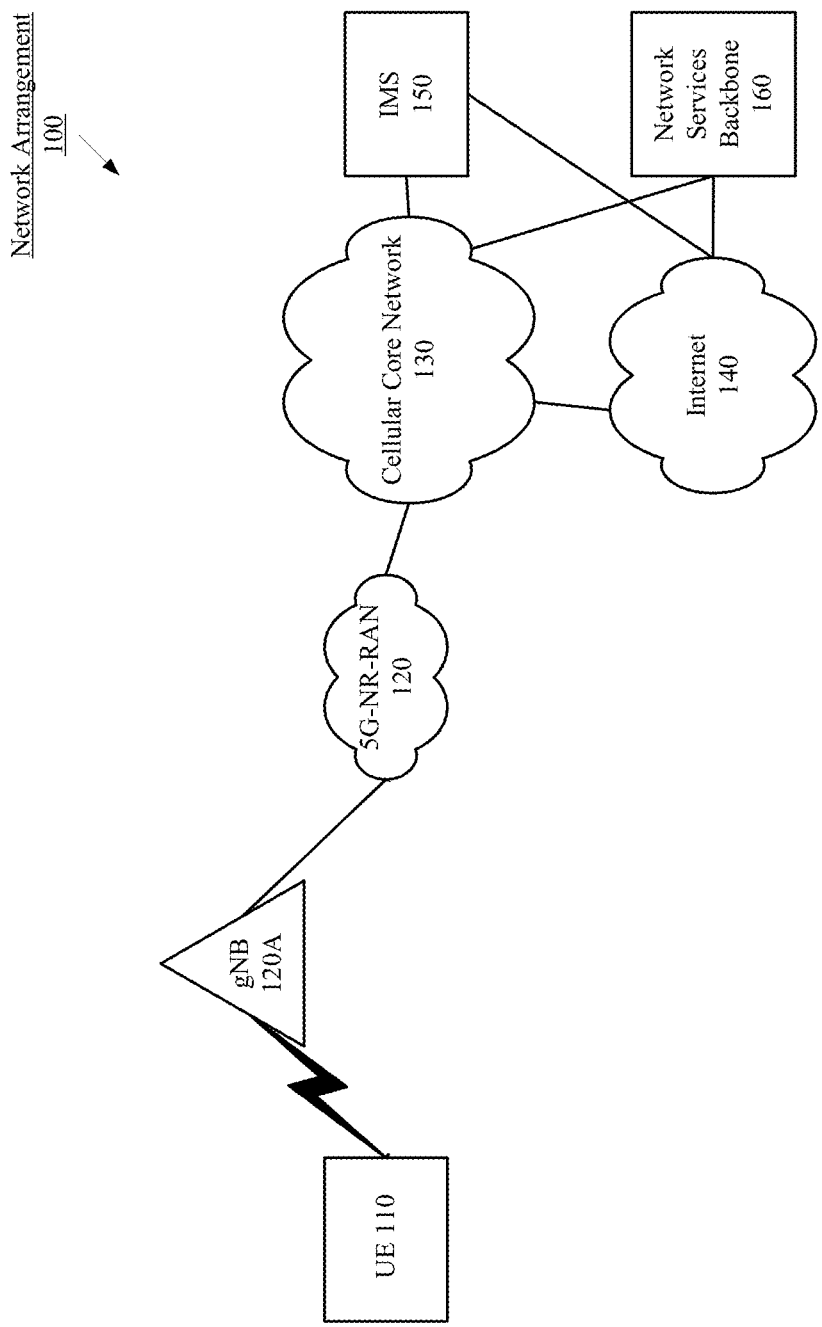
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to supporting a TPM design for 8 Tx Coherent PUSCH operation.

The exemplary embodiments are described with regard to a user equipment (UE). However, reference to the term UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate type of electronic component.

The exemplary embodiments are also described with regard to a fifth generation (5G) New Radio (NR) network. However, reference to a 5G NR network is merely provided for illustrative purposes. The exemplary embodiments may be applied to any appropriate type of network that supports SRS transmissions, including networks associated with future evolutions of the cellular standards, e.g., 6G networks.

The exemplary embodiments are related to supporting a TPM Design for 8 Tx Coherent PUSCH operation. As described above, the current TPM in NR only supports up to 4 antenna ports. The exemplary embodiments extend this support to 8 antenna ports. In the exemplary embodiments, for coherent PUSCH transmissions, for each layer of PUSCH, the network may indicate the phase/amplitude coefficient that the UE should apply for each antenna port among the 8 antenna ports.

The exemplary embodiments include a new 8 port TPM that may be based on the existing 4 port UL TPM and/or the existing 2 port UL TPM. In addition, the exemplary embodiments map different solutions to different antenna architectures. Each of these exemplary embodiments will be described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., a sixth generation (6G) network, a 5G cloud PAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR PAN 120. Therefore, the UE 110 may have at least a 5G NR chipset to communicate with the 5G NR PAN 120.

The 5G NR PAN 120 may be a portion of a cellular network that may be deployed by a network carrier (e.g., Verizon, AT&T, T-Mobile, etc.). The 5G NR RAN 120 may include, for example, base stations or access nodes (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR PAN 120. For example, as discussed above, the 5G NR PAN 120 may be associated with a particular cellular provider where the UE 110 and/or the user thereof has a contract and credential information (e.g., stored on a subscriber identity module (SIM) card). Upon detecting the presence of the 5G NR PAN 120, the UE 110 may transmit the corresponding credential information to associate with the 5G NR PAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
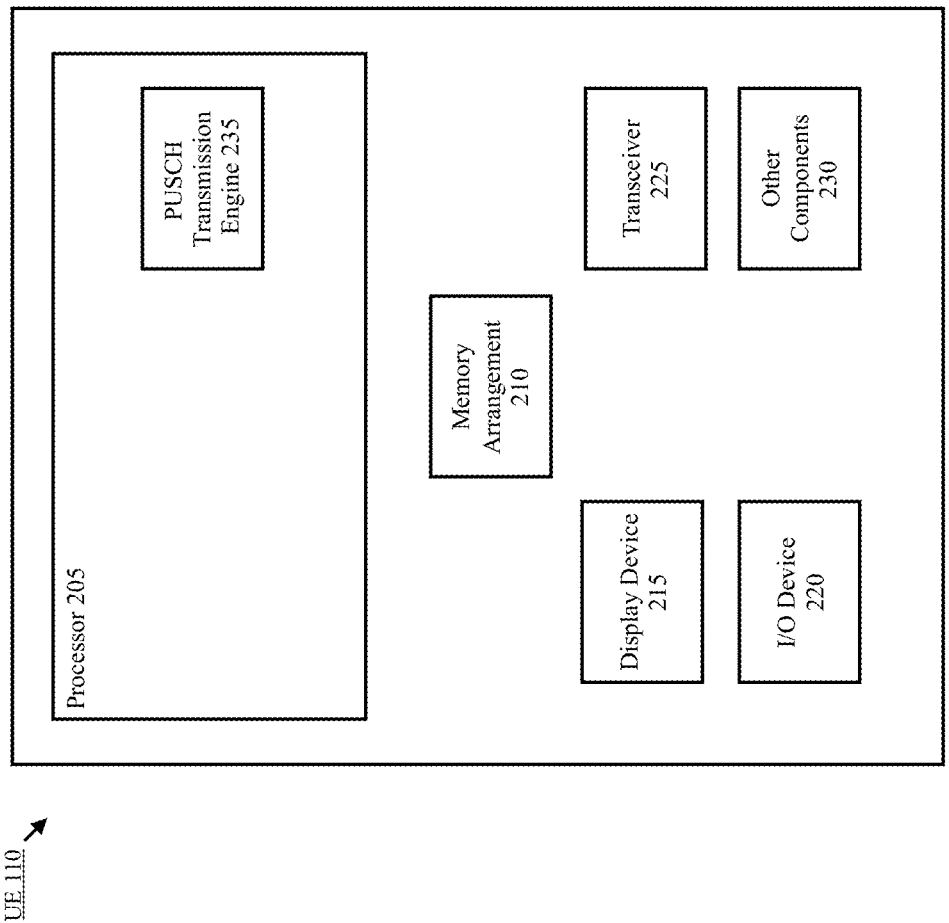
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a PUSCH transmission engine 235. The PUSCH transmission engine 235 may perform various operations such as, but not limited to, transmitting coherent PUSCH using a codebook according to a configuration received from the network, where the configuration comprises transmitting on 8 antenna ports with 1-8 layers.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
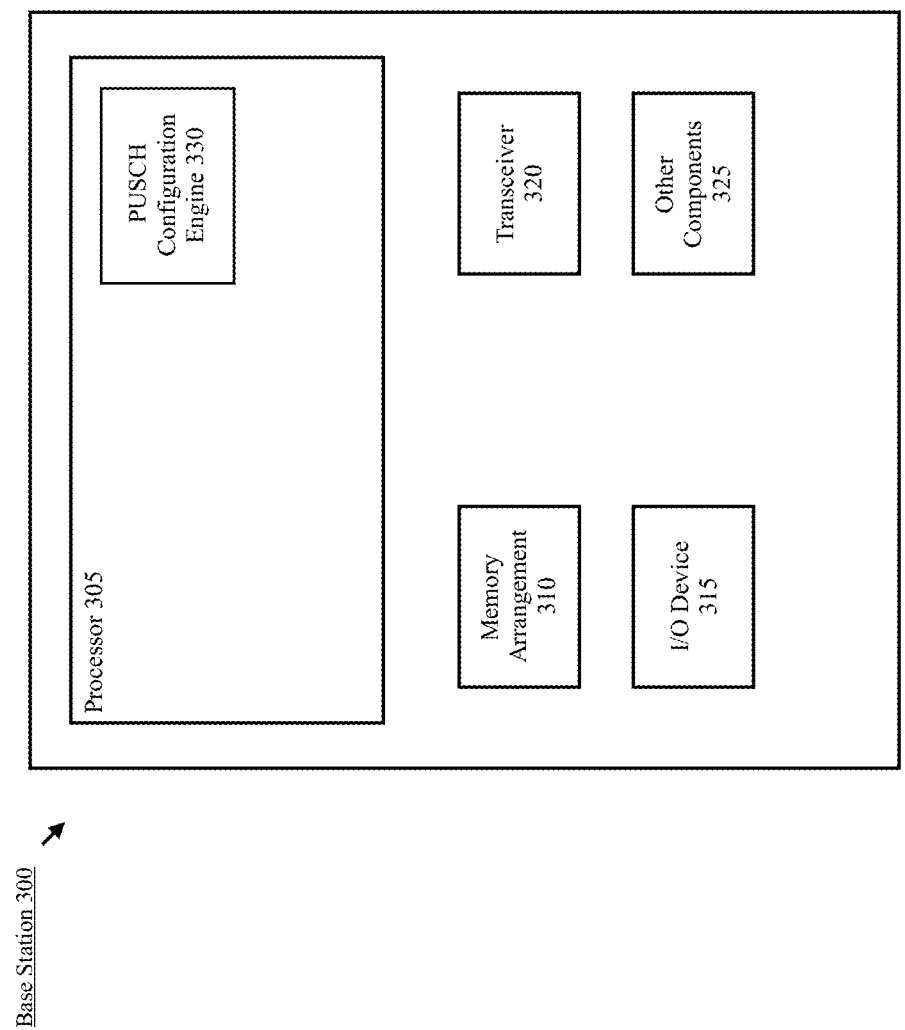
FIG. 3 shows an exemplary base station according to various exemplary embodiments.

FIG. 3 shows an exemplary base station 300 according to various exemplary embodiments. The base station 300 may represent the gNB 120A or any other type of access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices and/or power sources, transceiver chains, antenna elements, etc.

The processor 305 may be configured to execute a plurality of engines of the base station 300. For example, the engines may include a PUSCH configuration engine 330. The PUSCH configuration engine 330 may perform various operations such as, but not limited to, transmitting a PUSCH configuration to a UE for coherent PUSCH using a codebook, where the configuration comprises transmitting on 8 antenna ports with 1-8 layers.

The software being executed by the processor 305 is only exemplary. The functionality associated with the software may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
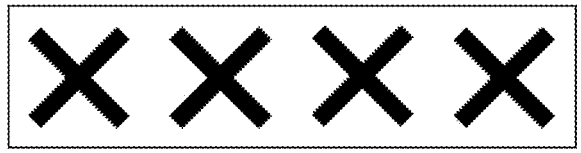
FIG. 4 shows four exemplary antenna architectures with 8 ports according to various exemplary embodiments.
Figure 4:
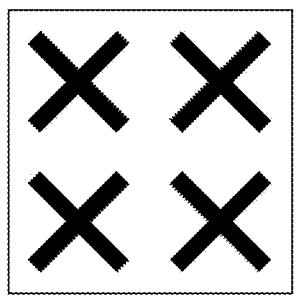
Figure 4:
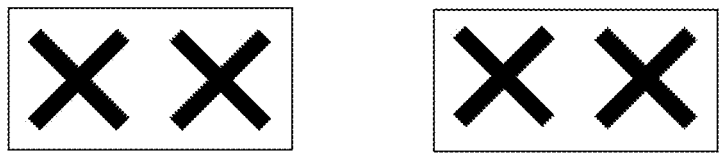
Figure 4:
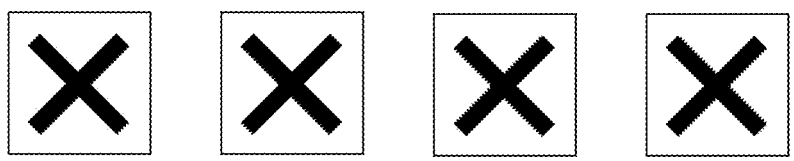

FIG. 4 shows four exemplary antenna architectures 410-440 with 8 ports according to various exemplary embodiments. The antenna architectures may be parameterized as $(N_g, N_1, N_2)$. $N_g$ is the number of antenna port groups. $N_1$ is the number of antenna locations in the vertical direction per group. $N_2$ is the number of antenna locations in the horizontal direction per group.

According to this parameterization, the exemplary antenna architectures 410-440 may be characterized as follows. The antenna architecture 410 $(N_g, N_1, N_2)=(1,4,1)$. The antenna architecture 420 $(N_g, N_1, N_2)=(1,2,2)$. The antenna architecture 430 $(N_g, N_1, N_2)=(2,2,1)$. The antenna architecture 440 $(N_g, N_1, N_2)=(4,1,1)$. It should be understood that these antenna architectures 410-440 are only exemplary for the purposes of illustrating the exemplary embodiments. The exemplary embodiments may be applied to any 8 port antenna architecture.

In some exemplary embodiments, a new Transmit Precoding Matrix (TPM) for 8 Tx coherent codebook PUSCH operation may be constructed using existing UL TPM that are defined in the 3GPP standards. For example, the existing UL TPM includes a UL TPM for 4 ports. A new TPM for 8 Tx coherent codebook PUSCH operation may be constructed from the existing UL TPM for 4 ports.

In this example, the TPM may be defined as:

$$W = \begin{bmatrix} W_1 \\ c*W_2 \end{bmatrix}$$

to support $L \leq 4$ number of layers of PUSCH operation with 8 Tx. $W_1$ and $W_2$ are two independently chosen existing UL TPM for $L \leq 4$ number of layers with 4 ports. In some exemplary embodiments, $W_1=W_2$. However, this is not a requirement. c is a quantized co-phasing term. For example, $c=\{1, -1, j, -j\}$. Again, this is only one list of exemplary co-phasing values and other values of c may be used.

Figure 5:
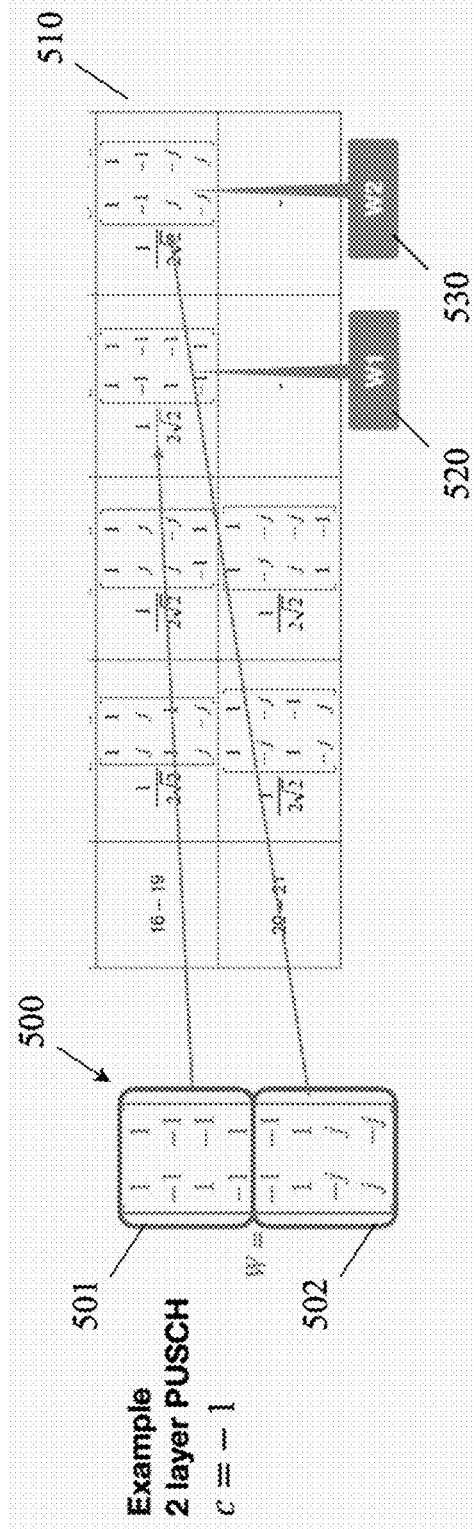
FIG. 5 shows an example of a new TPM for 8 Tx coherent codebook PUSCH operation having up to 4 layers constructed from the existing UL TPM for 4 ports according to various exemplary embodiments.

FIG. 5 shows an example of a new TPM 500 for 8 Tx coherent codebook PUSCH operation having up to 4 layers constructed from the existing UL TPM for 4 ports according to various exemplary embodiments. As described above, the new TPM 500 for 8 Tx coherent codebook PUSCH operation may be constructed from existing UL TPM for 4 ports. In this example, a table 510 includes some exemplary UL TPM for 4 ports that may be used to construct the TPM 500. It should be understood that the table 510 is only a portion of the UL TPM for 4 ports that are currently specified in the current 3GPP standards and other existing UL TPM for 4 ports may be used by the exemplary embodiments.

In this example, it may be considered that the PUSCH has 2 layers (e.g., L=2) and the value of c=−1 as shown in FIG. 5. Thus, according to the formula described above for the exemplary embodiments, two UL TPM for 4 ports are selected as $W_1$ 520 and $W_2$ 530. As described above, it is possible to select such that $W_1=W_2$, but that is not the case in this example. Thus, the new TPM 500 (W) is constructed according to the formula. The top portion 501 of the TPM 500 corresponds to the UL TPM for 4 ports $W_1$ 520 and the bottom portion 502 of the TPM 500 corresponds to the UL TPM for 4 ports $W_2$ 530 multiplied by the value of c=−1 in this example. As can be seen, the new TPM 500 may now be used for 8 ports (8 rows of the TPM 500) and 2 layers (2 columns of the TPM 500).

It should be apparent to those skilled in the art based on the formula provided above and the example as to how to build a new TPM for a different number or layers. As described above, this exemplary embodiment may be used to support $L \leq 4$ number of layers of PUSCH operation with 8 Tx.

In other exemplary embodiments, a new TPM for 8 Tx coherent codebook PUSCH operation may be constructed using the existing UL TPM for 4 ports. However, in these exemplary embodiments, the new TPM may support up to $L \leq 8$ layers.

In this example, the TPM may be defined as:

$$W = \begin{bmatrix} W_1 & W_2 \\ c*W_1 & -c*W_2 \end{bmatrix}(:, 1:L)$$

to support $L \leq 8$ number of layers of PUSCH operation with 8 Tx. Again, $W_1$ and $W_2$ are two independently chosen existing UL TPM for [L/2] or 4 number of layers with 4 ports and c is the quantized co-phasing term, where $c=\{1, -1, j, -j\}$. (:1:L) is the operation of taking the first L columns of the matrix.

Figure 6:
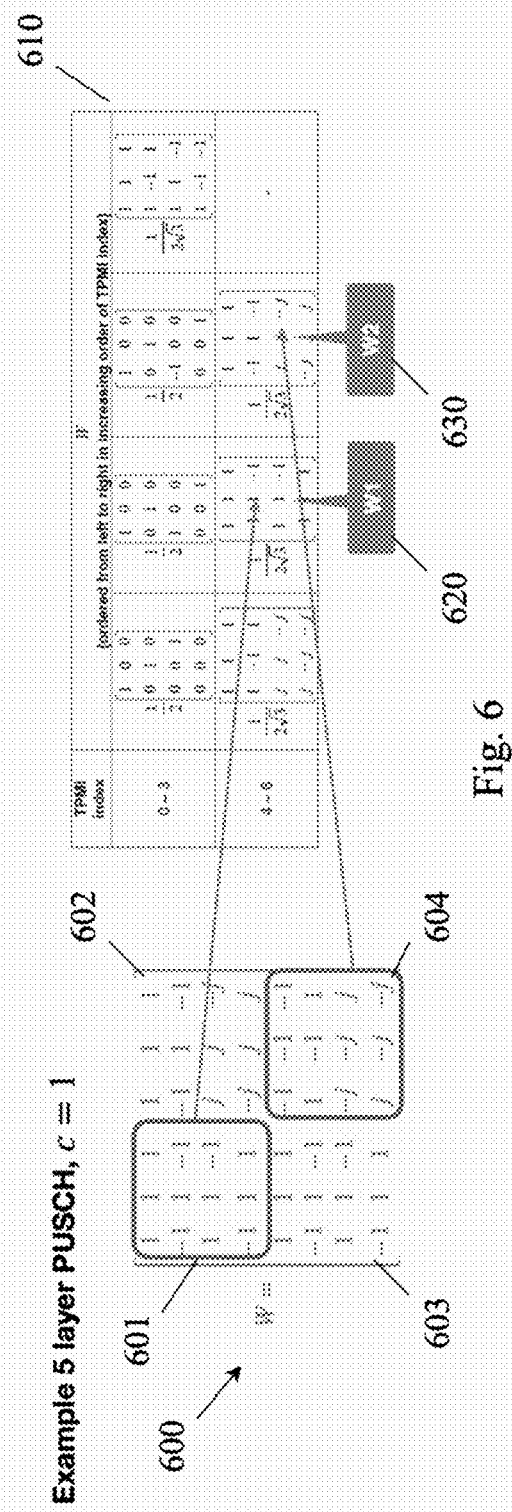
FIG. 6 shows a first example of a new TPM for 8 Tx coherent codebook PUSCH operation having up to 8 layers constructed from the existing UL TPM for 4 ports according to various exemplary embodiments.

FIG. 6 shows a first example of a new TPM 600 for 8 Tx coherent codebook PUSCH operation having up to 8 layers constructed from the existing UL TPM for 4 ports according to various exemplary embodiments. As described above, the new TPM 600 for 8 Tx coherent codebook PUSCH operation may be constructed from existing UL TPM for 4 ports. In this example, a table 610 includes some exemplary UL TPM for 4 ports that may be used to construct the TPM 600. It should be understood that the table 610 is only a portion of the UL TPM for 4 ports that are currently specified in the current 3GPP standards and other existing UL TPM for 4 ports may be used by the exemplary embodiments.

In this example, it may be considered that the PUSCH has 5 layers (e.g., L=5) and the value of c=1 as shown in FIG. 6. Thus, according to the formula described above for the exemplary embodiments, two UL TPM for 4 ports are selected as $W_1$ 620 and $W_2$ 630. As described above, it is possible to select such that $W_1=W_2$, but that is not the case in this example. Thus, the new TPM 600 (W) is constructed according to the formula. The top left portion 601 of the TPM 600 corresponds to the UL TPM for 4 ports $W_1$ 620. The top right portion 602 of the TPM 600 corresponds to the UL TPM for 4 ports $W_2$ 630. The bottom left portion 603 of the TPM 600 corresponds to the UL TPM for 4 ports $W_1$ 620 multiplied by the value of c=1 in this example. The bottom right portion 604 of the TPM 600 corresponds to the UL TPM for 4 ports $W_2$ 630 multiplied by the value of −c (c=1) in this example. As also described above, the (:1:L) operation of taking the first L columns of the matrix will also be performed. Thus, in this example, the first 5 columns of the TPM 600 will be used because L=5. As can be seen, the new TPM 600 may now be used for 8 ports (8 rows of the TPM 600) and 5 layers (the first 5 columns of the TPM 600).

It should be apparent to those skilled in the art based on the formula provided above and the example as to how to build a new TPM for a different number or layers. As described above, this exemplary embodiment may be used to support L≤8 number of layers of PUSCH operation with 8 Tx.

In still further exemplary embodiments, a new TPM for 8 Tx coherent codebook PUSCH operation may be constructed using the existing UL TPM for 4 ports. In these exemplary embodiments, the new TPM may support up to L≤8 layers.

In this example, the TPM may be defined as:

$$W = \begin{bmatrix} W_1 & W_2 \\ c*W_1 & -c*W_2 \end{bmatrix}$$

to support L≤8 number of layers of PUSCH operation with 8 Tx. Again, $W_1$ and $W_2$ are two independently chosen existing UL TPM. In this example, $W_1$ has $L_1$ layers and $W_2$ has $L_2$ layers, where $L_1+L_2=L$. There may be two options for selecting the $L_1$ and $L_2$. In a first option, $L_1$ may be [L/2] or [L/2] and $L_2$ may be [L/2] or [L/2]. In a second option, $L_1$ and $L_2$ may be arbitrary as long as $L_1+L_2=L$. c is again the quantized co-phasing term, where c={1, −1, j, —j}.

Figure 7:
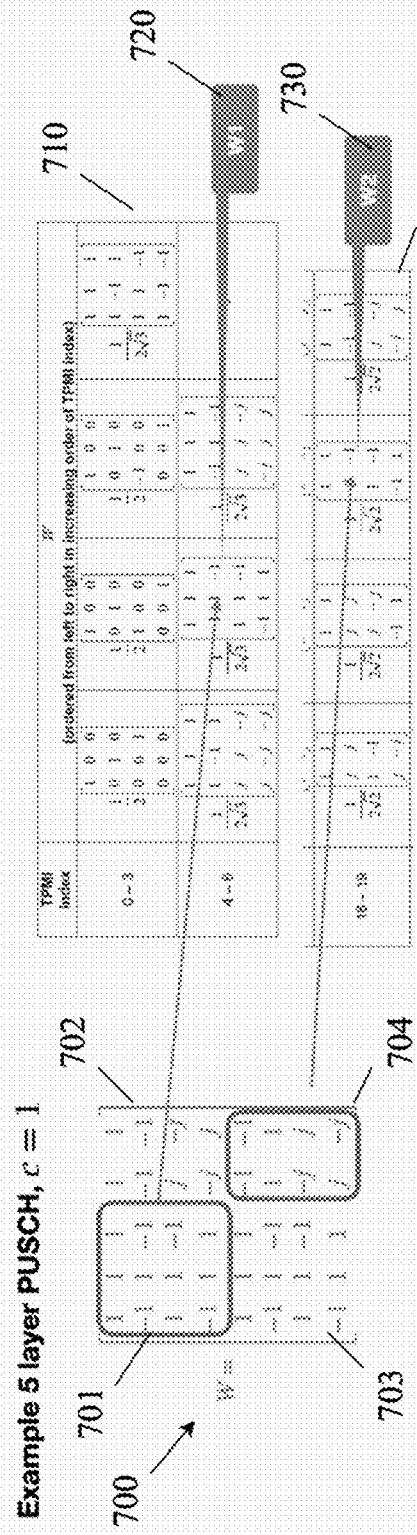
FIG. 7 shows a second example of a new TPM for 8 Tx coherent codebook PUSCH operation having up to 8 layers constructed from the existing UL TPM for 4 ports according to various exemplary embodiments.

FIG. 7 shows a second example of a new TPM 700 for 8 Tx coherent codebook PUSCH operation having up to 8 layers constructed from the existing UL TPM for 4 ports according to various exemplary embodiments. As described above, the new TPM 700 for 8 Tx coherent codebook PUSCH operation may be constructed from existing UL TPM for 4 ports. In this example, a first table 710 includes some exemplary UL TPM for 4 ports having various TPM indices that may be used to construct the TPM 700. This example also includes a second table 715 that includes some exemplary UL TPM for 4 ports having various TPM indices that may be used to construct the TPM 700. It can be seen that the first table 710 includes those TPMs that have indices where the TPM has 3 columns while the second table 715 includes those TPMs that have indices where the TPM has 2 columns.

In this example, it may be considered that the PUSCH has 5 layers (e.g., L=5) and the value of c=1 as shown in FIG. 7. Thus, according to the formula described above for the exemplary embodiments, two UL TPM for 4 ports are selected as $W_1$ 720 and $W_2$ 730. In this example, $W_1$ 720 has $L_1$=3 layers and $W_2$ 730 has $L_2$=2 layers. Thus, this satisfies the requirement that $L_1+L_2=L$ (e.g., 3+2=5 layers). In addition, as described above, it is also possible that $W_1$ 720 may be selected to have 2 layers and $W_2$ 730 may be selected to have 3 layers.

Thus, the new TPM 700 (W) is constructed according to the formula. The top left portion 701 of the TPM 700 corresponds to the UL TPM for 4 ports $W_1$ 720. The top right portion 702 of the TPM 700 corresponds to the UL TPM for 4 ports $W_2$ 730. The bottom left portion 703 of the TPM 700 corresponds to the UL TPM for 4 ports $W_1$ 720 multiplied by the value of c=1 in this example. The bottom right portion 704 of the TPM 700 corresponds to the UL TPM for 4 ports $W_2$ 730 multiplied by the value of −c (c=1) in this example. As can be seen, the new TPM 700 may now be used for 8 ports (8 rows of the TPM 700) and 5 layers (5 columns of the TPM 700).

It should be apparent to those skilled in the art based on the formula provided above and the example as to how to build a new TPM for a different number or layers. As described above, this exemplary embodiment may be used to support L≤8 number of layers of PUSCH operation with 8 Tx.

In the examples provided above, it was described that $W_1$ and $W_2$ are two independently selected existing UL TPM and that the value of c may be {1, −1, j, −j}. However, the number of TPMs may be reduced based on various restrictions. For example, as was described above, $W_1=W_2$. This would reduce the number of TPMs because there would only be one independently selected existing UL TPM. In another example, the value of c may be restricted to c={1, j}. Again, this would reduce the number of TPMs because two values of the quantized co-phasing term (c) are not used. It should be understood that one or more restrictions may be applied.

In the above exemplary embodiments, a new TPM for 8 Tx coherent codebook PUSCH operation was constructed using the existing UL TPM for 4 ports. In some exemplary embodiments, a new TPM for 8 Tx coherent codebook PUSCH operation may be constructed from the existing UL TPM for 2 ports.

For example, a new TPM for 8 Tx coherent codebook PUSCH operation may be constructed from the existing UL TPM for 2 ports using the formula have $W=W_1 \otimes W_2$. In this example, $W_1$ is the 4 port TPM with $L_1$ layers, $W_2$ is the 2 port TPM with $L_2$ layers and $\otimes$ is the Kronecker product. The resulting W is a $L=L_1*L_2$ layer TPM over 8 ports. For example, in matrix notation:

$$A \otimes B = \begin{bmatrix} a_{11}B & \cdots & a_{1n}B \\ \vdots & \ddots & \vdots \\ a_{m1}B & \cdots & a_{mn}B \end{bmatrix}$$

Figure 8:
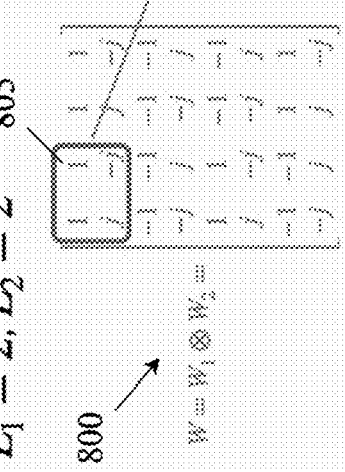
FIG. 8 shows an example of a new TPM for 8 Tx coherent codebook PUSCH operation having up to 8 layers constructed from the existing UL TPM for 4 ports and the existing UL TPM for 4 ports according to various exemplary embodiments.

FIG. 8 shows an example of a new TPM 800 for 8 Tx coherent codebook PUSCH operation having up to 8 layers constructed from the existing UL TPM for 4 ports and the existing UL TPM for 2 ports according to various exemplary embodiments. As described above, the new TPM 800 for 8 Tx coherent codebook PUSCH operation may be constructed from existing UL TPM for 4 ports and existing UL TPM for 2 ports using a Kroneker product $W=W_1 \otimes W_2$.

In this example, a first table 810 includes some exemplary UL TPM for 4 ports having various TPM indices that may be used to construct the TPM 800. This example also includes a second table 815 that includes some exemplary UL TPM for 2 ports having various TPM indices that may be used to construct the TPM 800. It can be seen that the first table 810 and second table 815 includes those TPMs that have indices where the TPM has 2 columns. Thus, in this example, $L_1$=2 and $L_2$=2 as shown in FIG. 8. Again, $W_1$ 820 and $W_2$ 830 are two independently chosen existing UL TPM.

Performing the Kroneker product operation on $W_1$ 820 and $W_2$ 830 results in the TPM 800. The entire Kroneker product operation will not be described, but just a sample as those skilled in the art will understand the math operations involved. In this example, it may be considered as to how the upper left portion 805 including the first two rows and first two columns are derived. As described above, the upper left value of $W_1$ 820, which is 1 is multiplied by the value of $W_2$ 830. Multiplying $W_2$ 830 by the value 1 results in the upper left portion 805 of TPM 800 being identical to $W_2$ 830. The remainder of the TPM 800 may also be determined in the same manner, e.g., multiplying the value of the entry of $W_1$ 820 by the value of $W_2$ 830. As can be seen, the new TPM 800 may now be used for 8 ports (8 rows of the TPM 800) and 4 layers (4 columns of the TPM 800) or $L=L_1*L_2$ layers (e.g., 2*2=4 layers).

It should be apparent to those skilled in the art based on the formula provided above and the example as to how to build a new TPM for a different number or layers. As described above, this exemplary embodiment may be used to support L≤8 number of layers of PUSCH operation with 8 Tx.

In the above example, performing the Kroneker product operation may results in a TPM that has more layers than the number of layers indicated by the rank indication (RI), e.g., RI is less than $L=L_1*L_2$. In a first option, only the first RI layers of the TPM precoder is used (e.g., R1=RI). In a second option, any R1 layers of the TPM precoder can be used.

As described above for the previous exemplary embodiments, restrictions may be applied to reduce the number of TPMs. In the currently described exemplary embodiments, restrictions may also be applied to reduce the number of TPMs. For example, one restriction may be that $L_1=4$ and $L_2=2$. Thus, only a subset of the available 4 port and 2 port TPMs may be used to construct the 8 port TPMs. In another example, only a subset of $W_1$ and/or $W_2$ can be selected from the allowed TPM in the current standards. It should be understood that one or more restrictions may be applied.

In the above examples, two categories of exemplary embodiments were described. The first category is based on generating the new TPM for 8 Tx coherent codebook PUSCH operation from the existing UL TPM for 4 ports. The second category is based on generating the new TPM for 8 Tx coherent codebook PUSCH operation from the existing UL TPM for 4 ports and the existing UL TPM for 2 ports. These different categories of exemplary embodiments may have advantages based on the antenna architecture that is implemented by the UE. The following will provide some examples of whether the first category or second category of the solutions are appropriate for some example antenna architecture arrangements. It should be understood that this does not mean that one of the categories cannot be applied to specific antenna architectures, just that the other category may have more advantages when applied to the specific antenna architectures.

The antenna architectures that will be discussed are the exemplary antenna architectures 410-430 described above with reference to FIG. 4. In a first example, either the first or second category of solutions may be applied to the first antenna architecture 410. In a second example, either the first or second category of solutions may be applied to the second antenna architecture 420. In a third example, it may be more efficient to apply the first category of solutions the third antenna architecture 430. In a fourth example, it may be more efficient to apply the second category of solutions the fourth antenna architecture 440.

In some exemplary embodiments, the 3GPP standards may allow the UE and network to apply either of the first or second category of solutions. In these situations, the UE and/or network will need to decide between the first and second category of solutions. In some exemplary embodiments, the selection may be based on the UE capability reporting. In one option, the UE may report the antenna architecture which is one to one mapped to either of the categories. In a second option, the UE may directly report whether the first or second category of solutions should be used.

In other exemplary embodiments, the selection may be based on UE reporting and the network configuration. For example, the UE may report whether the UE supports the first and/or second category and the network may then select one of the categories if the UE supports both categories.

EXAMPLES

In a first example, a user equipment (UE), comprises an antenna arrangement having a configuration where $N_g$ is a number of antenna port groups, $N_1$ is a number of antenna locations in a vertical direction per group and $N_2$ is a number of antenna locations in a horizontal direction per group and a processor configured to receive a Physical Uplink Shared Channel (PUSCH) configuration from a network, wherein the PUSCH configuration includes a codebook based Transmit Precoding Matrix Indicator (TPM) for 8 antenna ports and transmit PUSCH according to the PUSCH configuration.

In a second example, the UE of the first example, wherein the antenna arrangement comprises one of $(N_g, N_1, N_2)=(1, 4,1)$, $(N_g, N_1, N_2)=(1,2,2)$ or $(N_g, N_1, N_2)=(2,2,1)$, and wherein the TPM is constructed from at least two codebook based TPM for 4 antenna ports.

In a third example, the UE of the first example, wherein the antenna arrangement comprises one of $(N_g, N_1, N_2)=(1, 4,1)$, $(N_g, N_1, N_2)=(1,2,2)$ or $N_g, N_1, N_2)=(4,1,1)$, and wherein the TPM is constructed from at least one codebook based TPM for 2 antenna ports.

In a fourth example, the UE of the first example, wherein the processor is further configured to report the antenna arrangement configuration to a network.

In a fifth example, the UE of the first example, wherein the processor is further configured to report the UE supports a TPM that is constructed from at least two codebook based TPM for 4 antenna ports or a TPM that is constructed from at least one codebook based TPM for 2 antenna ports.

In a sixth example, a processor of a base station configured to configure a Physical Uplink Shared Channel (PUSCH) configuration, wherein the PUSCH configuration includes a codebook based Transmit Precoding Matrix Indicator (TPMI) comprising an indication of a Transmit Precoding Matrix (TPM) for 8 antenna ports and transmit the PUSCH configuration to a user equipment (UE).

In a seventh example, the processor of the sixth example, wherein the TPM is constructed from at least two codebook based TPM for 4 antenna ports.

In an eighth example, the processor of the sixth example, wherein the TPM is constructed from at least two codebook based TPM for 4 antenna ports, wherein the TPM comprises 4 or less layers and the at least two codebook based TPM for 4 antenna ports comprise 4 or less layers.

In a ninth example, the processor of the eighth example, wherein the TPM is constructed from at least two codebook based TPM for 4 antenna ports, wherein the TPM is defined as the parameter W and is constructed based on:

$$W = \begin{bmatrix} W_1 \\ c*W_2 \end{bmatrix}$$

where, $W_1$ is a first one of the at least two codebook based TPM for 4 antenna ports, $W_2$ is a second one of the at least two codebook based TPM for 4 antenna ports, and c is a quantized co-phasing term.

In a tenth example, the processor of the ninth example, wherein the TPM is constructed from at least two codebook based TPM for 4 antenna ports, wherein the parameter c comprises the values $\{1, -1, j, -j\}$ or only the values $\{1, j\}$.

In an eleventh example, the processor of the ninth example, wherein $W_1=W_2$.

In a twelfth example, the processor of the seventh example, wherein the TPM comprises 8 or less layers and the at least two codebook based TPM for 4 antenna ports comprise 4 or less layers.

In a thirteenth example, the processor of the twelfth example, wherein the TPM is defined as the parameter W and is constructed based on:

$$W = \begin{bmatrix} W_1 & W_2 \\ c*W_1 & -c*W_2 \end{bmatrix}(:, 1:L)$$

where, $W_1$ is a first one of the at least two codebook based TPM for 4 antenna ports, $W_2$ is a second one of the at least two codebook based TPM for 4 antenna ports, c is a quantized co-phasing term, and (:1:L) is an operation of taking a first L columns of the matrix.

In a fourteenth example, the processor of the thirteenth example, wherein the parameter c comprises the values $\{1, -1, j, -j\}$ or only the values $\{1, j\}$.

In a fifteenth example, the processor of the thirteenth example, wherein $W_1=W_2$.

In a sixteenth example, the processor of the twelfth example, wherein the TPM is defined as the parameter W and is constructed based on:

$$W = \begin{bmatrix} W_1 & W_2 \\ c*W_1 & -c*W_2 \end{bmatrix}$$

where, $W_1$ is a first one of the at least two codebook based TPM for 4 antenna ports, $W_2$ is a second one of the at least two codebook based TPM for 4 antenna ports, and c is a quantized co-phasing term.

In a seventeenth example, the processor of the sixteenth example, wherein $W_1$ comprises a first number of layers ($L_1$) and $W_2$ comprises a second number of layers ($L_2$), where $L_1+L_2$ equals a number of layers for the TPM.

In an eighteenth example, the processor of the sixth example, wherein the TPM is constructed from at least one codebook based TPM for 2 antenna ports.

In a nineteenth example, the processor of the eighteenth example, wherein the TPM is defined as the parameter W and is constructed based on $W=W_1 \otimes W_2$, where, $W_1$ is the at least one codebook based TPM for 2 antenna ports, $W_2$ is a second at least one codebook based TPM for 2 antenna ports or at least one codebook based TPM for 4 antenna ports, and $\otimes$ signifies a Kroneker product operation.

In a twentieth example, the processor of the nineteenth example, wherein a number of layers in the TPM is based on a product of a number of layers in $W_1$ and a number of layers in $W_2$.

In a twenty first example, the processor of the twentieth example, wherein, when a number of layers in a rank indication (RI) is less than the product, only a first number of layers of the TPM corresponding to the RI are used.

In a twenty second example, the processor of the twentieth example, wherein, when a number of layers in a rank indication (RI) is less than the product, any number of layers of the TPM corresponding to the RI are used.

In a twenty third example, the processor of the nineteenth example, wherein a number of layers in $W_1$ is restricted to 4 layers and a number of layers in $W_2$ is restricted to 2 layers.

In a twenty fourth example, the processor of the nineteenth example, $W_1$ or $W_2$ is restricted to a subset of available $W_1$ or $W_2$.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor configured to:
    receive a Physical Uplink Shared Channel (PUSCH) configuration from a network, wherein the PUSCH configuration includes a codebook based Transmit Precoding Matrix Indicator (TPMI) comprising an indication of a Transmit Precoding Matrix (TPM) for 8 antenna ports,
    wherein the TPM is constructed from at least two codebook based TPM for 4 antenna ports,
    wherein the TPM comprises 4 or less layers and the at least two codebook based TPM for 4 antenna ports comprise 4 or less layers,
    wherein the TPM is defined as a parameter W and is constructed based on:
    where, $W_1$ is a first one of the at least two codebook based TPM for 4 antenna ports, $W_2$ is a second one of the at least two codebook based TPM for 4 antenna ports, and c is a quantized co-phasing term; and
    transmit PUSCH according to the PUSCH configuration.

2. The processor of claim 1, wherein the parameter c comprises a first set of values {1, −1, j, −j} or only a second set of values { }.

3. The processor of claim 1, wherein $W_1=W_2$.

4. The processor of claim 1, wherein $W_1$ is different than $W_2$.

5. The processor of claim 1, wherein the PUSCH has two layers and a value of c=−1.

6. The processor of claim 1, wherein $W_1$ is different than $W_2$.

7. The processor of claim 1, wherein the PUSCH has two layers and a value of c=−1.

8. A processor configured to:
configure a Physical Uplink Shared Channel (PUSCH) configuration, wherein the PUSCH configuration includes a codebook based Transmit Precoding Matrix Indicator (TPMI) comprising an indication of a Transmit Precoding Matrix (TPM) for 8 antenna ports,
   wherein the TPM is constructed from at least two codebook based TPM for 4 antenna ports,
   wherein the TPM is defined as a parameter W and is constructed based on:
   where, $W_1$ is a first one of the at least two codebook based TPM for 4 antenna ports, $W_2$ is a second one of the at least two codebook based TPM for 4 antenna ports,
   c is a quantized co-phasing term, and (:1:L) is an operation of taking a first L columns of the matrix; and
   transmit the PUSCH configuration to a user equipment (UE).

9. The processor of claim 8, wherein the parameter c comprises a first set of values {1, −1, j, −j} or only the a second set of values { }.

10. The processor of claim 8, wherein $W_1=W_2$.

11. A processor configured to:
receive a Physical Uplink Shared Channel (PUSCH) configuration from a network, wherein the PUSCH configuration includes a codebook based Transmit Precoding Matrix Indicator (TPMI) comprising an indication of a Transmit Precoding Matrix (TPM) for 8 antenna ports,
   wherein the TPM is constructed from at least one codebook based TPM for 2 antenna ports,
   wherein the TPM is defined as a parameter W and is constructed based on:
   $$W=W_1 \otimes W_2$$
   where, $W_1$ is the at least one codebook based TPM for 2 antenna ports, $W_2$ is a second at least one codebook based TPM for 2 antenna ports or at least one codebook based TPM for 4 antenna ports, and $\otimes$ signifies a Kroneker product operation; and transmit PUSCH according to the PUSCH configuration.

12. The processor of claim 11, wherein a number of layers in the TPM is based on a product of a number of layers in $W_1$ and a number of layers in $W_2$.

13. The processor of claim 11, wherein, when a number of layers in a rank indication (RI) is less than the product, only a first number of layers of the TPM corresponding to the RI are used.

14. The processor of claim 11, wherein, when a number of layers in a rank indication (RI) is less than the product, any number of layers of the TPM corresponding to the RI are used.

15. The processor of claim 11, wherein a number of layers in $W_1$ is restricted to 4 layers and a number of layers in $W_2$ is restricted to 2 layers.

16. The processor of claim 11, $W_1$ or $W_2$ is restricted to a subset of available $W_1$ or $W_2$.

* * * * *